`US006811396B2`

United States Patent
Sudau et al.

(10) Patent No.: US 6,811,396 B2
(45) Date of Patent: Nov. 2, 2004

(54) CONTINUOUS CASTING UNIT WITH POST-ARRANGED FURNACE, ROUGHING STAND AND FINISHING TRAIN

(75) Inventors: Peter Sudau, Hilchenbach (DE); Klaus Bäumer, Kreuztal (DE); Karl-Friedrich Müller, Erndtebrück (DE)

(73) Assignee: SMS Demag AG, Düsseldorf (DE)

( * ) Notice: Subject to any disclaimer, the term of this patent is extended or adjusted under 35 U.S.C. 154(b) by 0 days.

(21) Appl. No.: 10/468,948

(22) PCT Filed: Jan. 25, 2002

(86) PCT No.: PCT/EP02/00751

§ 371 (c)(1),
(2), (4) Date: Dec. 22, 2003

(87) PCT Pub. No.: WO02/068138

PCT Pub. Date: Sep. 6, 2002

(65) Prior Publication Data

US 2004/0096299 A1 May 20, 2004

(30) Foreign Application Priority Data

Feb. 24, 2001 (DE) .................................. 101 09 055

(51) Int. Cl.[7] ............................................. C21D 9/68
(52) U.S. Cl. ..................... 432/121; 432/11; 432/195; 266/103
(58) Field of Search .................. 432/11, 122, 128, 432/121, 195; 266/203

(56) References Cited

U.S. PATENT DOCUMENTS

| 1,910,267 | A | | 3/1933 | Smith et al. | |
| 4,782,683 | A | * | 11/1988 | Tippins et al. | 72/229 |
| 5,490,315 | A | * | 2/1996 | Kostopolos et al. | 29/527.7 |
| 5,511,303 | A | * | 4/1996 | Tippins et al. | 29/527.7 |
| 5,833,455 | A | * | 11/1998 | Carr | 432/246 |
| 6,464,927 | B1 | * | 10/2002 | Benedetti | 266/111 |

FOREIGN PATENT DOCUMENTS

| DE | 4220424 | 12/1993 |
| EP | 0297491 | 1/1989 |
| EP | 0426576 | 5/1991 |

OTHER PUBLICATIONS

Beverley I et al: "Benefits of Heat Conservation Panels on British Steel's" Iron & Steel Engineer, BD. 69, No. 2, Feb. 1, 1992, pp. 40–48.

Brovman M ya et al: "Section for Oxygen cutting of Off–Grade Product on . . . " London, GB, BD. 20, No. 12, Dec. 1, 1990, pp. 589–591.

(List continued on next page.)

*Primary Examiner*—Gregory Wilson
(74) *Attorney, Agent, or Firm*—Friedrich Kueffner

(57) ABSTRACT

The aim of the invention is to develop a hot rolling unit, comprising at least one continuous casting unit (1) with a post-arranged furnace (4), followed by a roughing stand (5) and, over a strip edge guide, a soaking furnace (15) and finishing train, such that downtime is reduced to a minimum level and even during said downtime, as well as in planned cases of withdrawal of pre-strip material, the pre-strip (14), behind the roughing stand in the soaking furnace, can be separated off from the normal rolling cycle. Said aim is achieved, whereby the strip edge guide has a length of at least 4 m, the soaking furnace has, or is preceded by, at least one device for recognition of the strip edge position, the soaking furnace has a pivoting cover segment (30–32), a discharge device (29) may be displaced at least alongside the soaking furnace, running in the longitudinal direction thereof and the devices for determining the strip edge position have analytical units (14) and an emergency breaker device and/or a device for releasing emergency cutters.

9 Claims, 3 Drawing Sheets

OTHER PUBLICATIONS

Database WPI, Section CH., Derwent Publications Ltd. London, GB; Class M21, an 1973–67189U & JP48 035149 B (Hitachi Ltd), Oct. 26, 1973.

Patent Abstracts of Japan, vol. 008, No. 212, (C–244), Sep. 27, 1984 & JP 59 100212 A (Shin Nippon Seitetsu KK), Jun. 9, 1984.

* cited by examiner

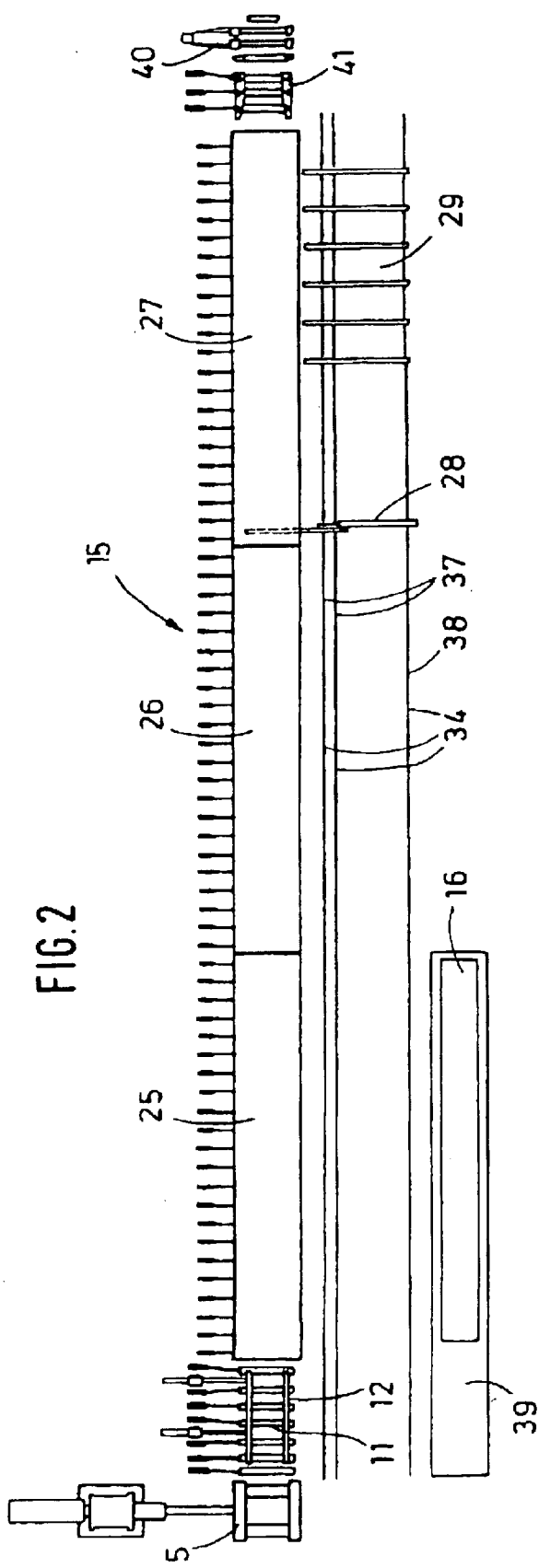
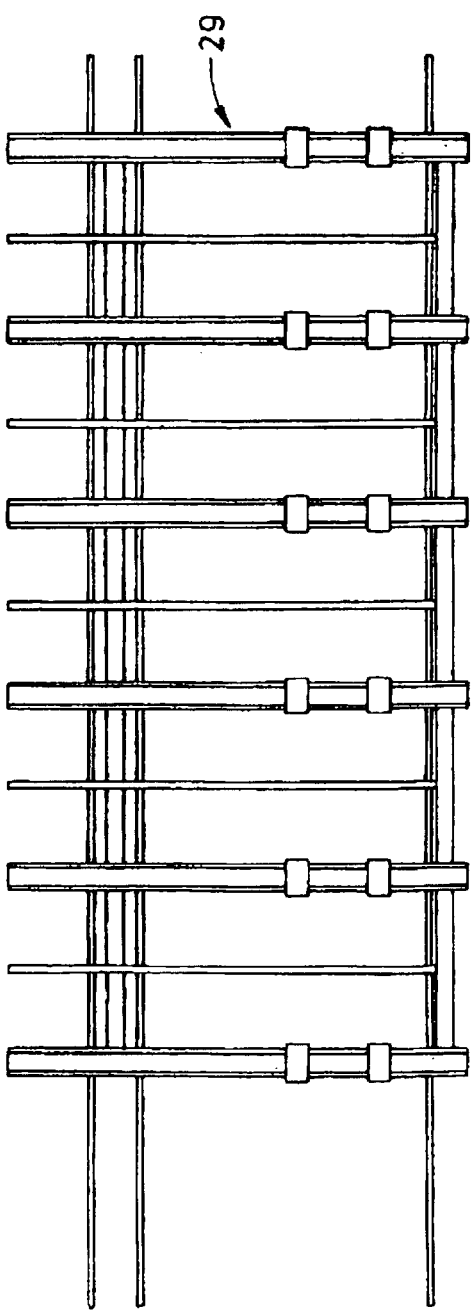

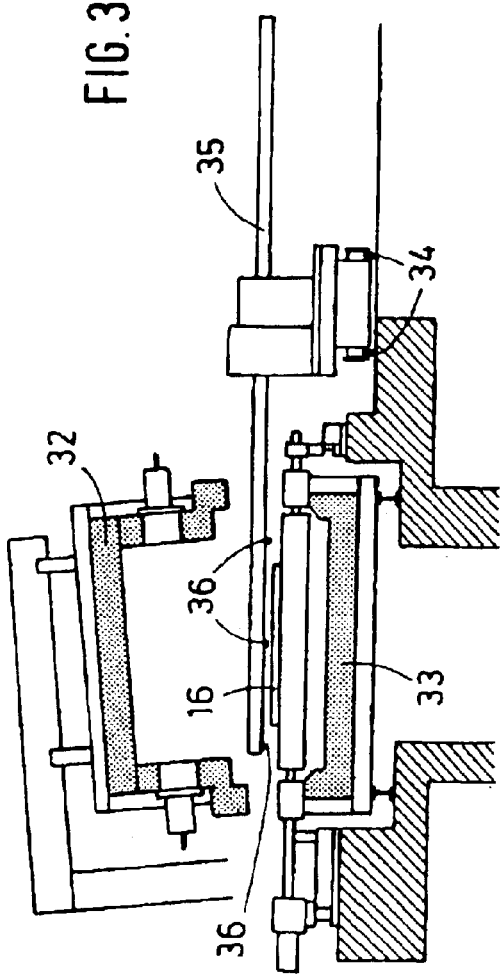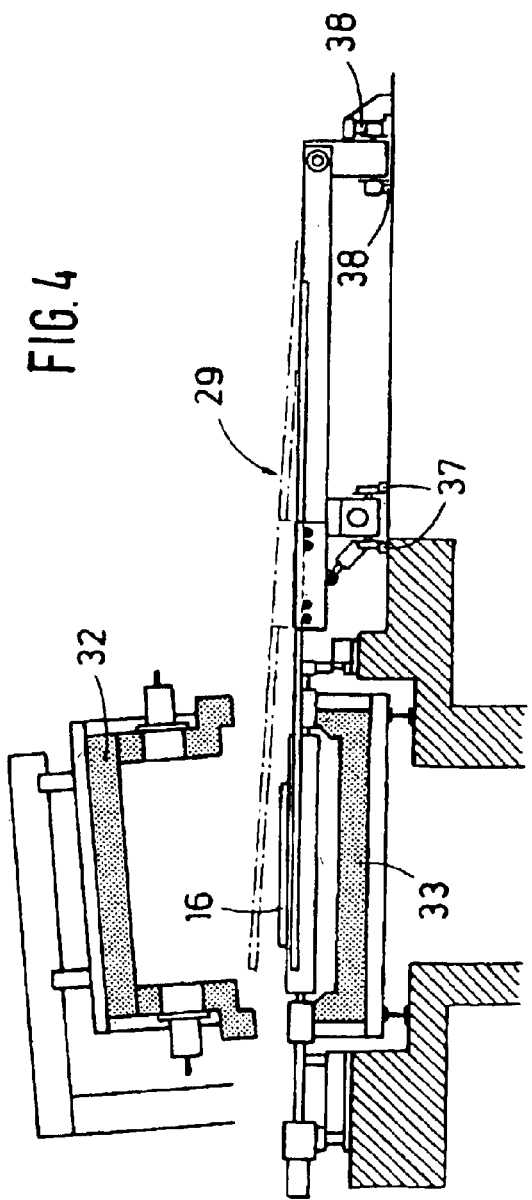

CONTINUOUS CASTING UNIT WITH POST-ARRANGED FURNACE, ROUGHING STAND AND FINISHING TRAIN

This application is a 371 of PCT/EP02/00751 filed Jan. 25, 2002.

The invention concerns a hot rolling mill, which consists of at least one continuous casting installation, followed by a furnace, a roughing stand, and, via a strip edge guide, a roller-hearth soaking furnace, as well as a finishing train.

A hot rolling mill of this type has basically proved successful. However, it has been found that, in the event of a disruption, whether as the result of problems with the stock or problems with the equipment, the desired interventions to restore normal operation cannot be carried out easily and especially not quickly enough, which means that, in such a case, it becomes necessary to discontinue the casting operation. The restarting of the rolling process thus requires considerable extra time.

Furthermore, it may be desirable, either during a disruption or during normal operation of the mill, to remove pre-strip material.

Therefore, the object of the invention is to reduce disruptions to a minimum and, both in the case of a disruption and in the case of the desired removal of pre-strip material, to make it possible to remove from the normal rolling operation the pre-strip that is lined up in the roller-hearth soaking furnace after the roughing stand.

This object is achieved with the features of the invention specified in claim 1. The lengthened strip edge guide protects the second furnace from damage by a saber-shaped course of the pre-strip, and early detection is possible by observation of the edges of the pre-strip. The pre-strip can be removed from the second furnace through its swiveling cover. It is advantageous for this cover to be subdivided in the longitudinal direction of the second furnace, so that pre-strip to be removed can be grasped not over its entire length, but rather only over a partial length. Accordingly, a lateral discharging device and a cut-to-length device that can be pushed into the furnace are provided, which can be moved laterally alongside the furnace. Especially if a device that triggers an emergency stop device or emergency cutters is assigned to the devices for determining the slab edge position, when an overly strong saber effect is detected, emergency cutting of the slabs or the pre-strips can be initiated before or in the furnace.

The invention is explained in detail below on the basis of a description of an embodiment of the invention shown in the drawings.

FIG. 2 shows a top view of the roughing stand, the second roller-hearth soaking furnace with a roller table connecting the stand and the roller-hearth soaking furnace, a discharging device and cut-to-length device assigned to the roller-hearth soaking furnace, and shears arranged after the furnace and before the finishing train.

FIG. 3 shows the flame-cutting machine provided as the cut-to-length device in FIG. 2 with the roller-hearth soaking furnace shown in a sectional side view with the cover raised.

FIG. 4 shows, in the same view as in FIG. 3, the discharging device of FIG. 2 designed as a walking beam conveyor.

FIG. 5 shows a top view of the walking beam conveyor of FIG. 4.

Figure 1:
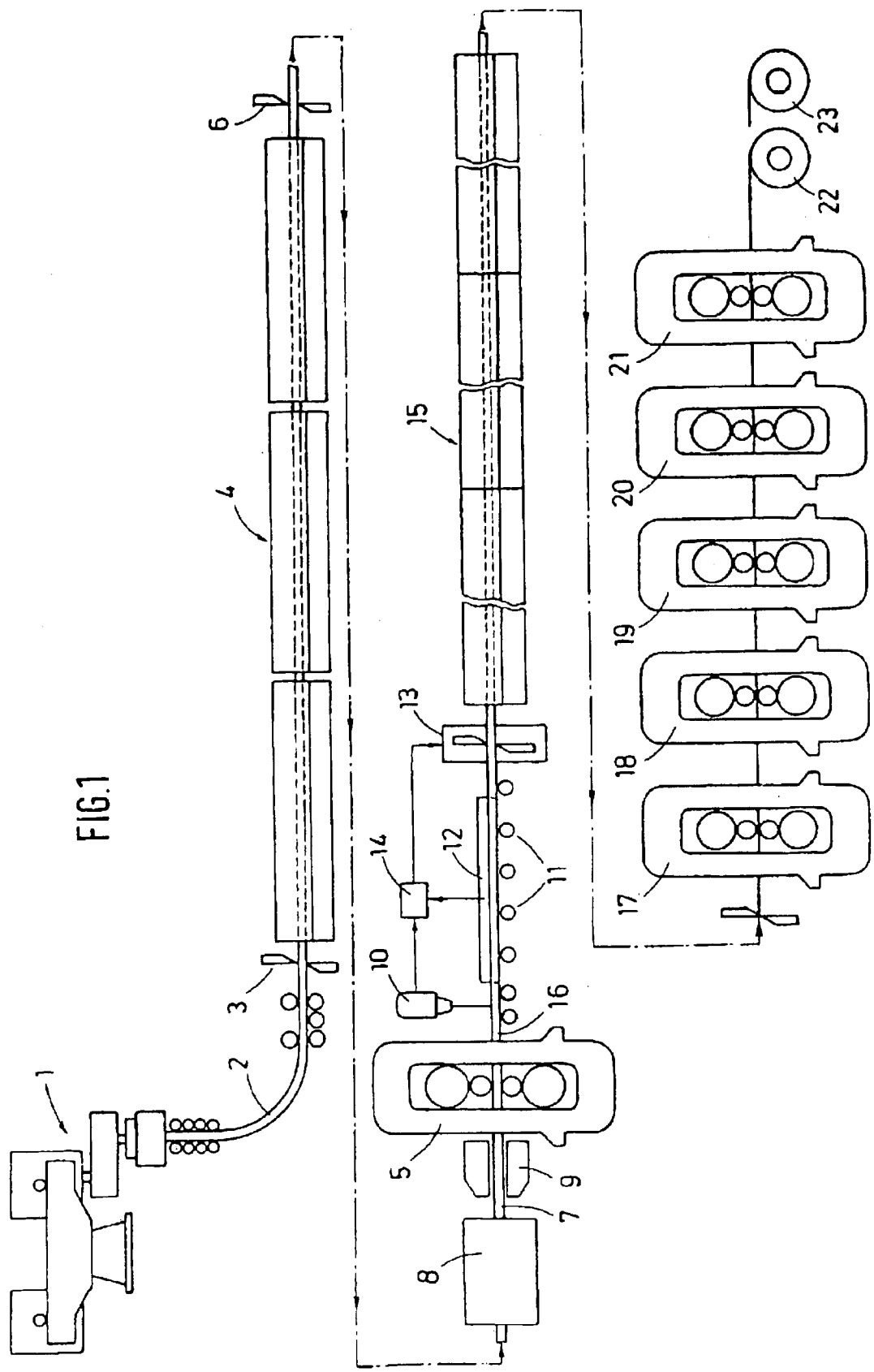
FIG. 1 shows the rolling mill in a schematic side view.

FIG. 1 shows a schematic perspective view of a hot-rolling mill. A continuous casting installation 1 continuously discharges a slab 2, which is cut into pieces of a preset maximum length by shears 3. These cut slabs 7 are fed through a first furnace 4 to a roughing stand 5. In the embodiment shown here, the maximum thickness of the slabs is 80 mm, and the width can be adjusted from 900 to 1,680 mm. The continuous slab 2 is cut into sections with a maximum length of 38 m.

Another set of shears 6 can be installed after the furnace 4. The slabs 7 then pass through a scale breaker 8 and a profile measuring device 9. The latter makes it possible to detect unsymmetrical profiles of the slabs 7 and, for example, by slight vertical offsetting of the working rolls of the roughing stand 5, to achieve constant lengthening of the slab 7 over its entire width and thus essentially prevent saber formations.

The roughing stand 5 is followed by a strip edge indicator 10, which can be designed as a camera. The interval between the roughing stand 5 and the following second roller-hearth soaking furnace 15 is bridged by a transition roller table 11, which is designed to be longer than has previously been customary, and guide rails 12 for the pre-strip 16 are installed in this zone. These guide rails 12 are designed, for example, with a length of 4 m, which is considerably longer than has previously been customary, and they are adjusted in such a way, depending on the width of the pre-strip 16, that they form a clear width of, for example, 10 mm with the strip edge. This means that when the pre-strip passes through in an orderly fashion, all wear is avoided, although in the event of the formation of a saber or in the event of lateral displacements of the pre-strip, higher lateral forces can be exerted on the pre-strip than was usually the case in the past, but the forces absorbed by the guide rails 12 are smaller than with the shorter guide rails previously used.

After leaving the second roller-hearth soaking furnace 15, the pre-strip 16 enters the finishing train, which comprises stands 17 to 21, in which the pre-strip 16, which has already been reduced, for example, to 35 mm, is further reduced to a thickness of 20 mm to 1 mm. After this finish rolling, the strip is coiled by strip coilers 22 and 23.

Planned stock removal is carried out in the second roller-hearth soaking furnace 15, and also if saber formation is too intense, the pre-strip 16 is cut here and immediately removed, so that there is practically no disruption of the operation, and the casting of the continuous slabs 2 can be continued essentially nonstop.

It should again be noted that the profile of the slabs 7 is determined by the profile measuring device 9, so that a uniformly lengthened pre-strip without any tendency to curve is already achieved by offsetting or unsymmetrical adjustment of the working rolls of the roughing stand 5. This is already being monitored before the pre-strip 16 enters the roller-hearth soaking furnace 15 by the strip edge-indicator 10 as well as by the possible load on the guide rails 12, which is determined by suitable sensors. If a lateral drift or saber formation of the pre-strip 16 exiting the roughing stand 5 is detected by the strip edge indicator 10 and/or by the load on the guide rails 12, the measurement results are fed to the evaluation unit 14, which can initiate the operation of a cut-to-length device 13 before the pre-strip 16 even enters the second roller-hearth soaking furnace. Moreover, several additional strip edge indicators are installed in the second roller-hearth soaking furnace 15, so that a lateral drift within the furnace can also be detected, and appropriate emergency measures can be initiated.

As FIG. 2 shows, the second roller-hearth soaking furnace 15 is divided into three furnace sectors 25 to 27. The covers of these sectors are installed separately and independently of one another for dividing the pre-strip and/or for removing sections of the pre-strip. In this regard, FIG. 2 shows a cut-to-length device 28 designed as a flame-cutting machine and a discharging device 29 that acts by means of walking beams, both of which devices can be moved along the length of the furnace on rails.

The division of the second roller-hearth soaking furnace 15 into three furnace sectors 25 to 27 and the division of the upper part of the furnace into three separately controllable and swiveling cover segments 30 to 32 make it possible to swivel only one of the cover segments 30 to 32 upward at one time and thus to open the furnace only along this segment, so that the heat loss and the energy consumption corresponding to this heat loss remain limited. The discharging device 29, which can be moved along the furnace, makes it possible to remove pre-strip stock from each of the three segments, while the other two upper parts of the furnace remain closed. The discharging device is designed in such a way that interruptions of the casting operation are unnecessary as a result of the fast response time, low maintenance, and ease of operation. Therefore, stock can be removed as desired independently of the overall plant design without affecting the rest of the plant and without interrupting production.

In the case of very long pre-strip stock, it must be divided or cut into pieces before it can be removed. Lengths of pre-strip can be separated and removed even when the stock is unsatisfactory and/or drifting laterally. In a case such as this, the flame-cutting machine 28 of FIGS. 2 and 3 is moved up to the intended point of separation. FIG. 3 shows the base 33 of the second roller-hearth soaking furnace 15, whose cover segment 32 has been raised to remove the pre-strip stock 16. The flame-cutting machine 28 was moved to the desired place on guide rails 34, and, after the cover segment 32 has been raised, the traverse 35 of the flame-cutting machine is moved to the left out of its movement position, shown as a solid line, into its cutting position, shown as a broken line. After a possibly necessary lowering onto the pre-strip 16, the flame-cutting machine 28 begins the cutting operation with two burner tips 36 that operate parallel to each other. The cutting operation is finished after a movement to the right by half the maximum pre-strip width.

The removal of the lengths of pre-strip stock up to a maximum length of one of the sectors of the second roller-hearth soaking furnace 15 is carried out with the discharging device 29, which is designed as a walking beam conveyor, which is shown in the sectional side view of the second roller-hearth soaking furnace in FIG. 4 and in the top view in FIG. 5. The cover segment 32 of the base 33 of the second roller-hearth soaking furnace 15 is also raised here. The discharging device 29 is moved along the longitudinal side of the furnace on sets of rails 37 and 38 to the desired place and then pushed into the furnace. While the set of rails 37 basically supports the weight, the set of rails 38 has a track that grips the rollers from below and from above, so that even with variable loads, the lever of the angle of inclination remains secured. With suitable cyclic operation of the walking beams, the section of the pre-strip 16 gripped from below is pushed laterally from the second roller-hearth soaking furnace 15 in sections, until the walking beam sections can be pulled back and out of the furnace, and then the cover segment 32 can be lowered again. The section of pre-strip 16 that has been removed can be moved along the sets of rails 37, 38 by movement of the walking beam conveyor 29 to the location 39 in FIG. 2, where the pre-strip sections 16 are deposited for further use or until they are to be moved elsewhere.

Pre-strip stock can be removed from the second roller-hearth soaking furnace between the roughing stand and the finishing train with the use of this discharging device. This removal may be desired for technical reasons related to the rolling process or production process, or it may become necessary due to lateral drift of the pre-strip. The following are some of the reasons that might be mentioned:

a saber was rolled for reasons related to the initial stock;

a saber formed during rolling in the roughing stand due to a nonuniform temperature gradient across the width of the strip;

sabers can also be formed due to different rolling forces on the drive side and tending side of the stand, which were not caused by results of the profile measuring device;

various errors of the operating crew in the area of the roughing stand;

technical problems in the area of the roughing stand;

technical problems in the area from the casting installation to the roughing stand; the stock is unsuitable for further finishing;

in the event of other problems throughout the plant, stock can also be removed to prevent shutdown of the casting operation;

stock can be removed to be used further in another plant.

In FIG. 2, after the outlet of the second roller-hearth soaking furnace 15 and before the shears 40, a separate feed hopper 41 is installed at the entrance to the stands of the finishing train, which guarantees that even stock which is not centered as it leaves the second roller-hearth soaking furnace 15, nevertheless is properly and centrically guided into the stands 17 to 21 of the finishing train.

List of Reference Numbers 1 continuous casting installation
2 slab
3 shears
4 furnace
5 roughing stand
6 shears
7 cut slab
8 scale breaker
9 profile measuring device
10 strip edge indicator
11 transition roller table
12 guide rail
13 cut-to-length device
14 evaluation unit
15 roller-hearth soaking furnace
16 pre-strip
17 stand
18 stand
19 stand
20 stand
21 stand
22 strip coiler
23 strip coiler
25 furnace sector
26 furnace sector
27 furnace sector
28 cut-to-length device
29 discharging device
30 cover segment
31 cover segment
32 cover segment
33 base of the roller-hearth soaking furnace
34 guide rails 35 traverse
36 burner tips
37 set of rails
38 set of rails
39 drop site (for sections of pre-strip)
40 shears
41 feed hopper

What is claimed is:

1. Hot-rolling plant, which consists of at least one continuous casting installation (1), followed by a furnace (4), a roughing stand (5) and, via a strip edge guide, a roller-hearth soaking furnace (15), as well as a finishing train, wherein the strip edge guide has a length of at least 4 m, that the roller-hearth soaking furnace (15) has or is preceded by at least one device for detecting the position of the strip edge, that the roller-hearth soaking furnace (15) has at least one swiveling cover segment (30 to 32), that a discharging device (29) that extends in the longitudinal direction of the roller-hearth soaking furnace (15) can be moved at least alongside the roller-hearth soaking furnace (15), and that evaluation devices (14) and a device that triggers an emergency switch device and/or emergency cutters are assigned to the devices that determine the positions of the strip edges.

2. Hot-rolling plant in accordance with claim 1, wherein the strip edge guides are guide rails (12).

3. Hot-rolling plant in accordance with claim 1, wherein the devices for determining the position of the strip edge are cameras.

4. Hot-rolling plant in accordance with claim 1, wherein the cover of the roller-hearth soaking furnace is divided, and the cover segments (30 to 32) can be swiveled separately.

5. Hot-rolling plant in accordance with claim 1, wherein the cut-to-length device (28) is a flame-cutting machine.

6. Hot-rolling plant in accordance with claim 1, wherein the length of the discharging device is only a partial length of the roller-hearth soaking furnace (15).

7. Hot-rolling plant in accordance with claim 1, wherein the cut-to-length device (28) and the discharging device (29) can be moved on rails (34, 37, 38).

8. Hot-rolling plant in accordance with claim 1, wherein the cut-to-length device (28) can be positioned at preset sites of use.

9. Hot-rolling plant in accordance with claim 1, wherein the cut-to-length device (28) can also be used before the roller-hearth soaking furnace (15).

* * * * *